US009541095B2

(12) United States Patent
Mathey et al.

(10) Patent No.: US 9,541,095 B2
(45) Date of Patent: Jan. 10, 2017

(54) HOUSING OF A RADIAL COMPRESSOR

(71) Applicant: ABB TURBO SYSTEMS AG, Baden (CH)

(72) Inventors: Christoph Mathey, Fislisbach (CH); Joel Schlienger, Zürich (CH); Olaf Baudisch, Winterthur (CH); Patrick Aberle, Untersiggenthal (CH)

(73) Assignee: ABB TURBO SYSTEMS AG, Baden (CH)

( * ) Notice: Subject to any disclaimer, the term of this patent is extended or adjusted under 35 U.S.C. 154(b) by 400 days.

(21) Appl. No.: 14/248,774

(22) Filed: Apr. 9, 2014

(65) Prior Publication Data

US 2014/0301827 A1    Oct. 9, 2014

(30) Foreign Application Priority Data

Apr. 9, 2013 (EP) .................................. 13162987

(51) Int. Cl.
| F02B 33/44 | (2006.01) |
| F04D 29/42 | (2006.01) |
| F02B 37/02 | (2006.01) |
| F02B 37/013 | (2006.01) |
| F01D 9/02 | (2006.01) |
| F01D 25/26 | (2006.01) |

(52) U.S. Cl.
CPC .......... *F04D 29/4293* (2013.01); *F01D 9/026* (2013.01); *F01D 25/26* (2013.01); *F02B 37/013* (2013.01); *F02B 37/02* (2013.01)

(58) Field of Classification Search
CPC ........ F01D 25/26; F01D 9/026; F02B 37/013; F02B 37/02; F04D 29/4293
See application file for complete search history.

(56) References Cited

U.S. PATENT DOCUMENTS

| 3,829,235 A * | 8/1974 | Woollenweber, Jr. .. F04D 25/16 415/143 |
| 6,305,169 B1 * | 10/2001 | Mallof .................... F01D 15/10 60/608 |
| 7,469,689 B1 * | 12/2008 | Jones ...................... F02B 33/40 123/41.31 |

(Continued)

FOREIGN PATENT DOCUMENTS

| DE | 197 56 097 A1 | 6/1999 |
| DE | 10 2010 030 516 A1 | 12/2011 |

(Continued)

OTHER PUBLICATIONS

European Search Report dated Oct. 7, 2013.

*Primary Examiner* — Jesse Bogue
(74) *Attorney, Agent, or Firm* — Barnes & Thornburg LLP

(57) ABSTRACT

Exemplary embodiments of the present disclosure are directed to a 2-stage supercharging unit having a housing unit which integrates within it a high-pressure charger and a low-pressure charger. The rotor axes of the two chargers are vertical with respect to the housing unit, which can be screwed directly via the housing base to the side of an internal combustion engine. As a result, increased flexibility is made possible with regard to the connection of the supercharging unit to the cooler and to the internal combustion engine, whereby the structural volume of the supercharging assembly can be additionally reduced.

20 Claims, 9 Drawing Sheets

(56) References Cited

U.S. PATENT DOCUMENTS

| | | | |
|---|---|---|---|
| 2004/0040300 A1* | 3/2004 | Klingel | F02B 37/013 60/612 |
| 2006/0225419 A1* | 10/2006 | Prusinski | F01D 25/18 60/605.1 |
| 2009/0241542 A1* | 10/2009 | Ono | F01D 25/16 60/624 |
| 2010/0126016 A1 | 5/2010 | An et al. | |
| 2011/0131985 A1 | 6/2011 | Smatloch et al. | |
| 2011/0239648 A1* | 10/2011 | Shiraishi | F01D 25/18 60/605.3 |
| 2011/0318164 A1* | 12/2011 | Kopp | F01D 11/003 415/113 |
| 2014/0013730 A1* | 1/2014 | Humburg | F01N 3/00 60/323 |

FOREIGN PATENT DOCUMENTS

| | | |
|---|---|---|
| EP | 2 050 940 A1 | 4/2009 |
| EP | 2 267 285 A2 | 12/2010 |
| EP | 2 386 761 A2 | 11/2011 |
| GB | 369033 A | 3/1932 |
| WO | WO 2012/098175 A1 | 7/2012 |

\* cited by examiner

A: Air
E: Exhaust Gas

HOUSING OF A RADIAL COMPRESSOR

RELATED APPLICATION

This application claim priority under 35 U.S.C. §119 to European application No. 13162987.5 filed in Europe on Apr. 9, 2013, the content of which is hereby incorporated by reference in its entirety.

FIELD

The disclosure relates to the field of supercharged internal combustion engines, and particularly to an exhaust-gas turbocharger and to a multi-stage supercharging assembly having multiple exhaust-gas turbochargers with housings of a vertically arranged radial compressor.

BACKGROUND INFORMATION

To increase the power of an internal combustion engine, use is made of exhaust-gas turbochargers which have a compressor positioned upstream of the engine and have a turbine, connected via a common shaft, in the exhaust tract of the internal combustion engine. The supercharging of an internal combustion engine increases the air flow rate and thus also the fuel flow rate into the cylinders, resulting in a significant increase in power of the engine. The exhaust-gas turbochargers used for this purpose are, as standard, made up of a rotor including compressor wheel, turbine wheel and shaft, and of the shaft bearing arrangement, the flow-guiding housing parts (compressor housing and turbine housing respectively) and the bearing housing.

Known internal combustion engines can be supercharged by means of exhaust-gas turbochargers in single-stage combination with one turbocharger per engine bank resulting in pressure ratios of up to PIV=6. One possible system diagram of the single-stage supercharging configuration is shown in FIG. 3. For the newer generation of internal combustion engines, the pressure ratio is being increased, by means of two-stage supercharging, to up to PIV=12 and greater. The benefit of two-stage supercharging lies substantially in a considerable reduction in NOx exhaust-gas emissions, an increase in engine power density, and in an increase in engine efficiency.

The two-stage supercharging system is made up primarily of a series-connected low-pressure and high-pressure turbocharger and of an additional intercooler between the two compressor stages. One possible system diagram of the two-stage supercharging configuration is illustrated in FIG. 2 alongside the system diagram of the single-stage supercharging configuration. Owing to the intercooling, less compressor work is specified for the compression of a predefined air flow rate and pressure ratio, whereby the efficiency of the supercharging system can be increased. Finally, analogously to the single-stage system, the compressed air from the two-stage supercharging system is cooled by the charge-air cooler at the inlet of the internal combustion engine and is conducted into the engine.

By comparison to the single-stage system, the structural volume to be attached to an internal combustion engine in the case of a two-stage supercharging system is, with the additional components, significantly more complex and of greater inherent volume. Through logical integration of the specified components, however, said structural volume can be reduced, and the supercharging system made more compact.

With a two-stage supercharging system, the number of turbochargers and cooler assemblies specified for an internal combustion engine is doubled in relation to the single-stage system, whereby the complexity of the line guidance and the size of the structure to be attached to the engine increase. For example, the connecting lines between the compressor stages and the intercooler and the additional exhaust line between the high-pressure turbine stage and the low-pressure turbine stage should be integrated in the structure to be attached.

The attachment concept and the line guidance are highly dependent on the respective type of construction of the engine, because the exhaust lines are in part guided to the side of the engine or centrally with respect to the engine axis. The position of the fresh-air lines is likewise dependent on the type of construction of the engine. FIG. 1 schematically shows attachment options of exhaust lines (E) and fresh-air supply lines (A) for V-configuration engines according to an exemplary embodiment of the disclosure. The attachment situation in the case of in-line engines with only one engine bank corresponds to one half of the attachment situation in the case of a V-configuration engine.

The high-pressure and low-pressure chargers should be located on the engine such that the exhaust lines and fresh-air supply lines between the supercharging system and the engine and between the supercharging system and the cooler assemblies have the minimum possible structural lengths and structural volumes. It should also be ensured that the flow guidance in the lines exhibits the fewest possible diversions for the benefit of low flow losses.

SUMMARY

A housing of a radial compressor is disclosed, comprising: a housing casing which surrounds a cavity and which has multiple side surfaces; and a volute housing arranged in an interior of the housing casing, said volute housing having a central through opening for accommodating a compressor wheel and for supplying air from the cavity to the compressor wheel arranged in said opening, and having a further opening for discharging flow from the volute housing; wherein a side surface of the housing casing includes a first opening for a lead through of the compressor wheel to be arranged in the volute housing, wherein a side surface of the housing casing includes a second opening for discharging, from the housing casing, the flow out of the volute housing, and wherein at least one side surface of the housing casing includes a third opening for supplying air into the cavity in the interior of the housing casing.

BRIEF DESCRIPTION OF THE DRAWINGS

Embodiments of the compressor housing according to the disclosure will be explained below based on the drawings, in which.

DETAILED DESCRIPTION

Figure 1:
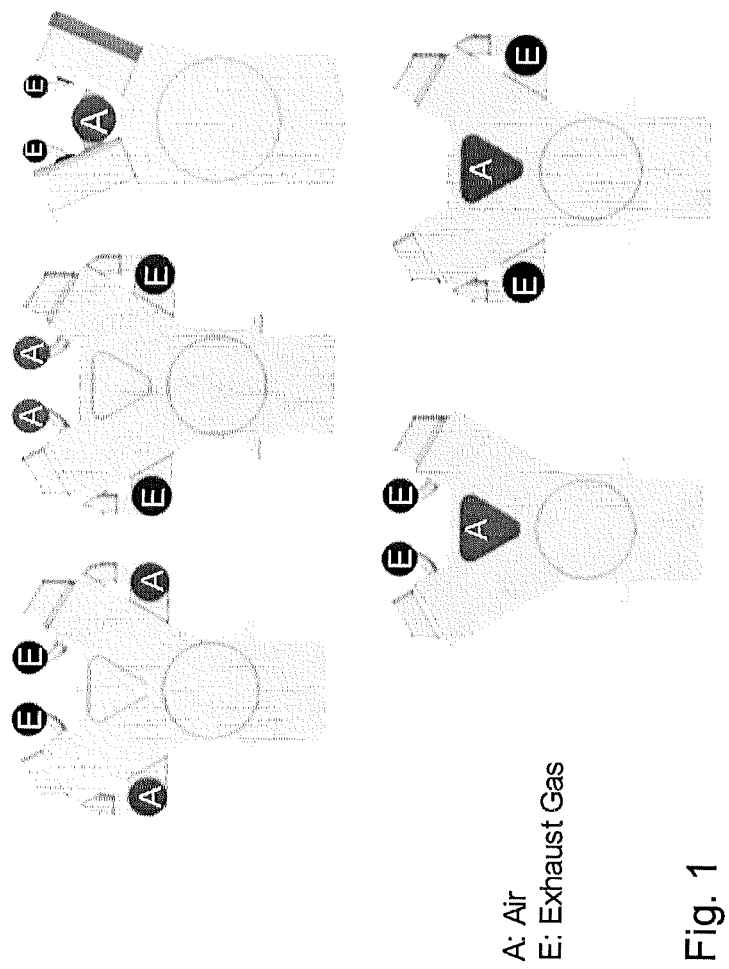
FIG. 1 schematically shows attachment options of exhaust lines (E) and fresh-air supply lines (A) for V-configuration engines according to a known implementation.

Exemplary embodiments of the present disclosure provide an optimized the housing of a radial compressor.

The exemplary housing of a radial compressor according to the present disclosure includes a housing casing which surrounds a cavity and which has multiple side surfaces, and a volute housing arranged in the interior of the housing casing.

The volute housing has a central through opening. The opening serves first to accommodate a compressor wheel, which can be inserted into the volute housing through the opening. Second, the central opening serves to supply air out of the cavity surrounding the volute housing to a compressor wheel arranged in the opening. The volute housing has a further opening for the discharge of the flow from the volute housing.

Into one of the side surfaces of the housing casing, there is formed a first opening for the lead-through of a compressor wheel to be arranged in the volute housing. Furthermore, into one of the side surfaces of the housing casing, there is formed a second opening for the discharge, from the housing casing, of the flow conducted out of the volute housing. Furthermore, a third opening for the supply of air into the cavity in the interior of the housing casing is formed into at least one side surface of the housing casing.

According to an exemplary embodiment of the present disclosure, the through opening in the volute housing runs in a vertical direction, and the housing is consequently provided for accommodating a compressor that rotates about a vertical axis.

The volute housing and the housing casing optionally share a side wall, wherein the opening for the lead-through of the compressor wheel is formed into the common side wall. The central through opening in the volute housing thus issues into the opening in the common side wall.

The housing casing optionally has multiple third openings for the supply of air into the cavity in the interior of the housing casing, the third openings optionally being formed into different side surfaces in each case. The supply openings can be provided in the form of a connection flange for the fastening of an air supply pipe or in the form of an opening covered by a filter grate. It is optionally possible for one or more of the multiple third openings to be closed off by means of a cover.

Such a housing of a radial compressor is optionally a part of a housing apparatus, wherein the housing casing is surrounded by a housing jacket. According to an exemplary embodiment of the present disclosure, a cavity which is filled with liquid extends between the housing jacket and the housing casing. The openings in the housing casing are led out of the housing jacket through corresponding openings in the housing jacket.

In accordance with another exemplary embodiment, multiple such housings of a radial compressor are a part of a housing apparatus, wherein the housing casings are jointly surrounded by a housing jacket: According to an exemplary embodiment disclosed herein, a cavity which is filled with liquid extends between the housing jacket and the housing casings. The openings in the housing casings are led out of the housing jacket through corresponding openings in the housing jacket.

Such housing apparatuses can be used in exhaust-gas turbochargers including a vertically arranged rotor with a turbine wheel and a compressor wheel, wherein the compressor wheel is arranged in the housing apparatus.

In accordance with yet another exemplary embodiment, in the case of an exhaust-gas turbocharger disclosed herein, liquid, for example bearing oil, is conducted out of a bearing region of the rotor into the cavity between the housing jacket and the housing casing. Here, the liquid runs down over the housing casing, or if the volute housing is integrated into the upper wall of the housing casing, over the volute housing, under the force of gravity.

The housing of the turbine can be arranged vertically above the housing jacket. In an exemplary embodiment of the present disclosure, a multi-part insulation shell arrangement which is fitted on the housing jacket completely surrounds the turbine housing. Here, the insulation shell arrangement leaves free an opening for the supply of the hot exhaust gases and an opening for the discharge of the hot exhaust gases.

The above-mentioned exemplary housing devices are used in a supercharging assembly including multiple exhaust-gas turbochargers each with a vertically arranged rotor with in each case one turbine wheel and one compressor wheel, wherein the multiple compressor wheels are arranged in a respective housing apparatus.

According to another exemplary embodiment, in the case of an exhaust-gas turbocharger disclosed herein, liquid, for example bearing oil, is conducted out of a bearing region of the rotors into the cavity between the housing jacket and the housing casings. Here, the liquid runs down over the respective housing casings, or if the volute housings are each integrated into the upper wall of the housing casings, over the volute housings, under the force of gravity.

Multiple exhaust-gas turbochargers can be connected to form a multi-stage supercharging system, wherein the compressor and turbine of two successive stages are connected in each case in series, such that the turbine of the higher stage is positioned upstream of the turbine of the lower stage and the compressor of the higher stage is positioned downstream of the compressor of the lower stage.

In accordance with an exemplary embodiment disclosed herein, multiple exhaust-gas turbochargers can be connected in parallel. Here, the volume flow can be distributed in single-stage configuration to multiple chargers, and the chargers can be installed in a housing unit according an exemplary embodiment.

Figure 3:
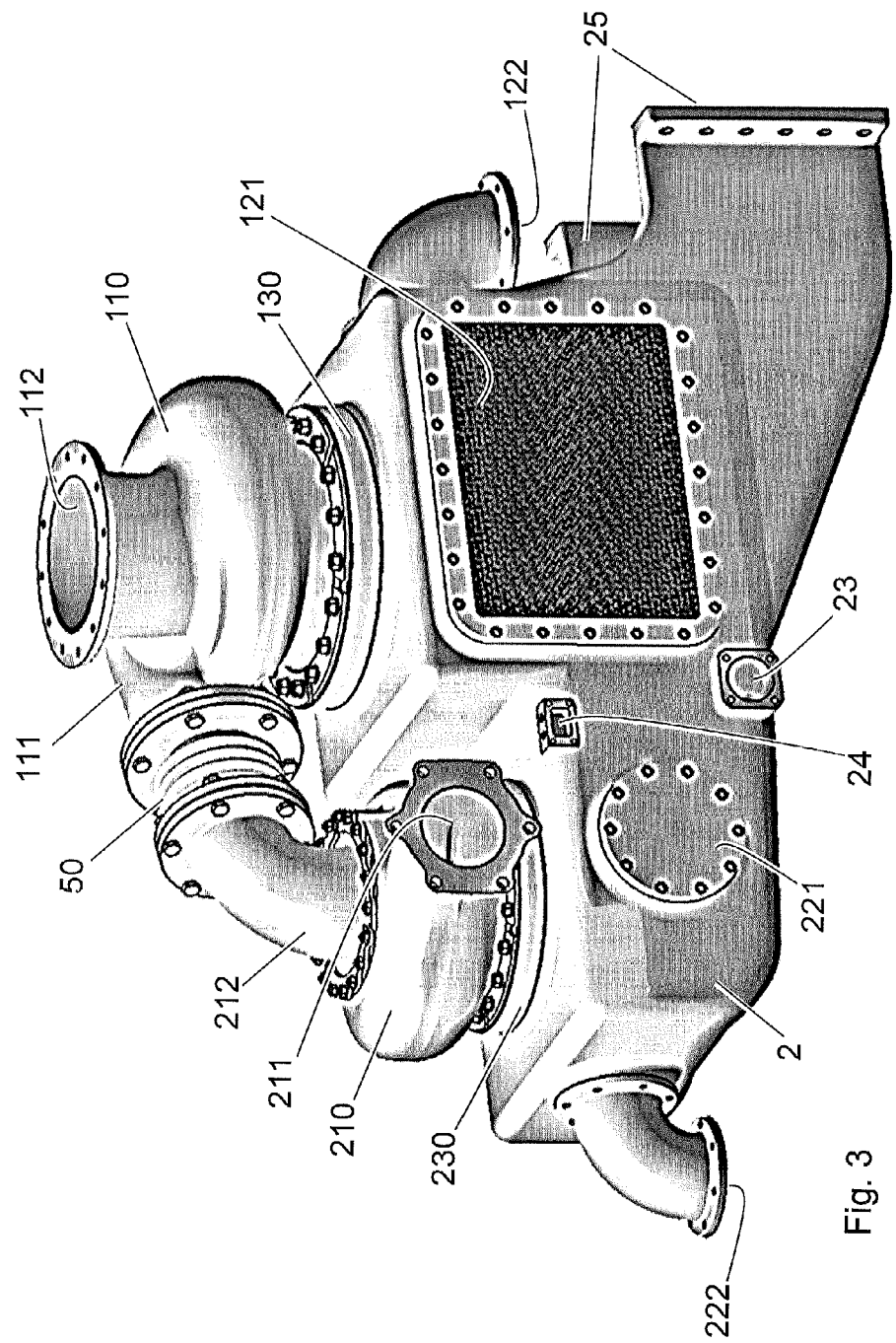
FIG. 3 shows an isometric view of a two-stage exhaust-gas turbocharger arrangement with a compressor housing according to an exemplary embodiment of the disclosure.
Figure 4:
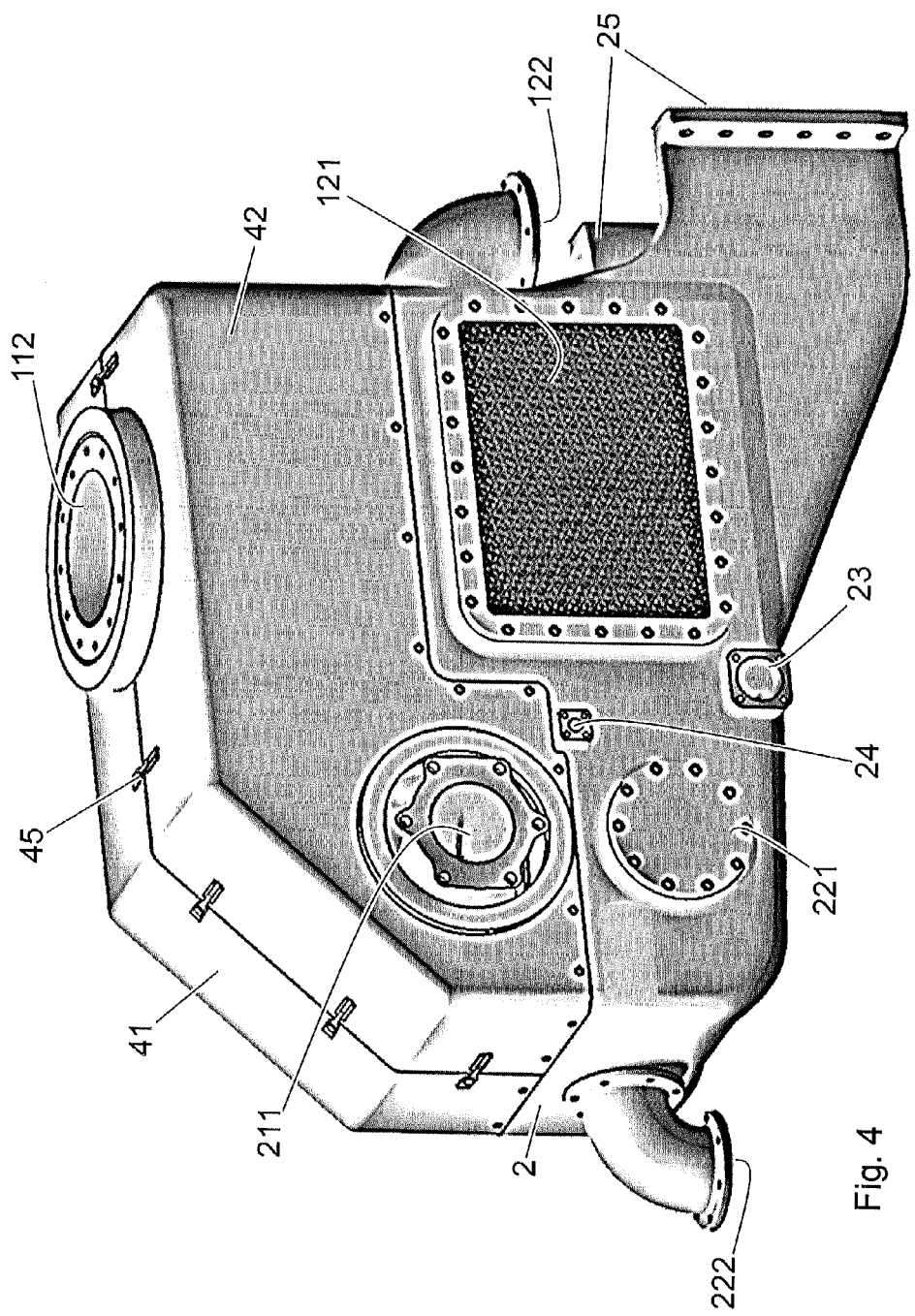
FIG. 4 shows the two-stage exhaust-gas turbocharger arrangement of FIG. 3 with an insulation shell arrangement fitted thereon according to an exemplary embodiment of the disclosure.

Yet another exemplary embodiment of the present disclosure is directed to a supercharging assembly where the housings of the turbines are arranged vertically above the housing jacket. FIG. 4 shows the two-stage exhaust-gas turbocharger arrangement of FIG. 3 with an insulation shell arrangement fitted thereon according to an exemplary embodiment of the disclosure. In this case, a multi-part insulation shell arrangement that is fitted on the housing jacket completely surrounds the turbine housing. The insulation shell arrangement leaves free an opening for the supply of the hot exhaust gases to the turbine stages and an opening for the discharge of the exhaust gases after the latter have passed through the turbine stages.

The housing jacket of an exhaust-gas turbocharger or of a supercharging assembly optionally has a fastening flange for the fastening of the exhaust-gas turbocharger or of the supercharging assembly, respectively, to an internal combustion engine.

Owing to integration of multiple housing parts into a housing unit, an exemplary embodiment according to the present disclosure, the compressor housing of a radial compressor permits, in a two-stage or multi-stage supercharging system, an attachment on the engine which takes up little structural space and which can be mounted and dismounted easily. The vertical arrangement of the rotor blocks facilitates access for servicing personnel.

Figure 2:
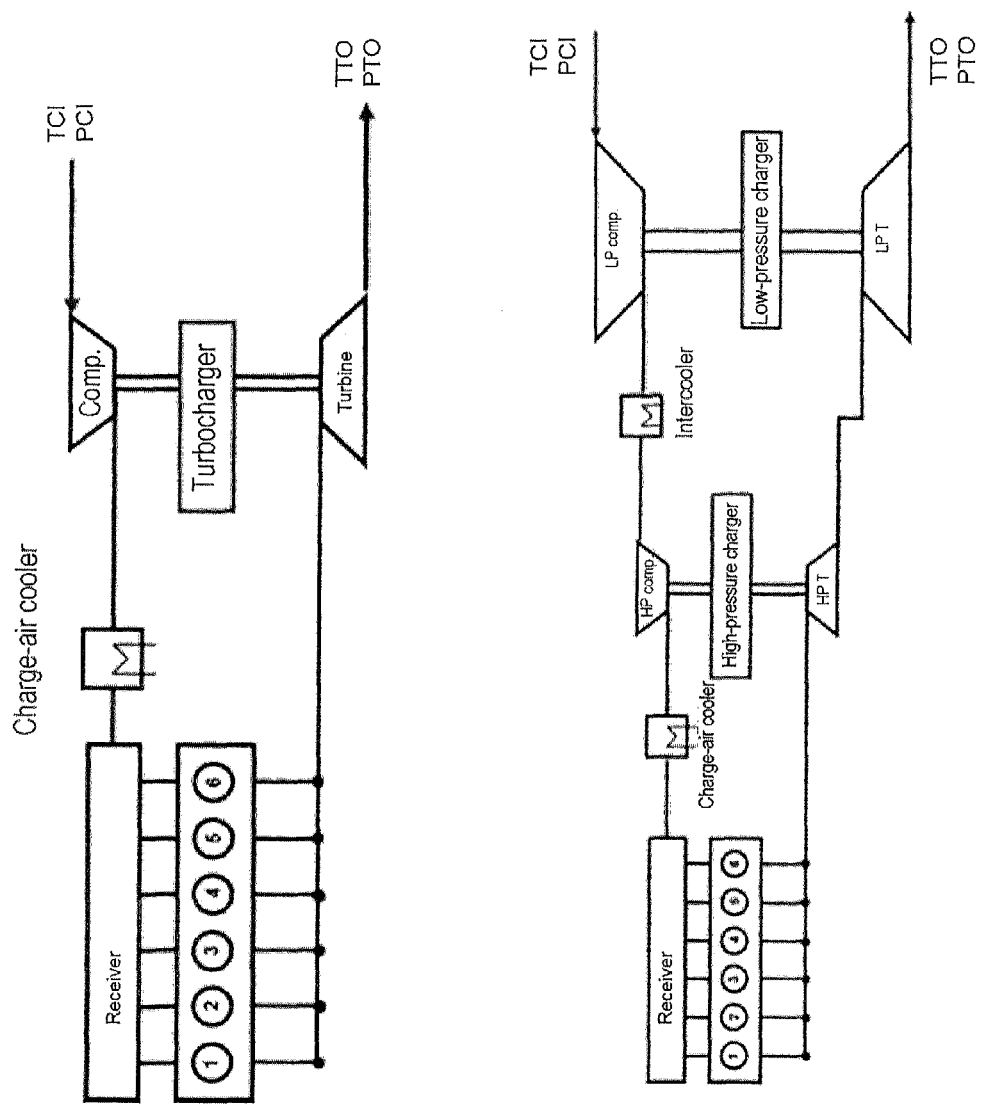
FIG. 2 shows a system diagram of a single-stage supercharging configuration and a two-stage supercharging configuration according to an exemplary embodiment of the disclosure.

An exemplary arrangement according to the disclosure will be described based on the high-pressure turbocharger (in each case on the left in the Figures, for example in the section shown in FIG. 9). FIG. 2 shows a system diagram of a single-stage supercharging configuration and a two-stage supercharging configuration according to an exemplary embodiment of the disclosure. FIG. 3 shows an isometric view of a two-stage exhaust-gas turbocharger arrangement with a compressor housing according to an exemplary embodiment of the disclosure. The compressor housing includes the volute housing 220 (120 in the low-pressure charger), which volute housing itself can also be of multi-part form. The volute housing includes the spiral-shaped collecting chamber for the compressed air and, together with the hub of the compressor wheel 225 (125) arranged in the central opening 226 (126) of the volute housing, delimits the flow duct in the region of the compressor wheel. For the flow, the volute housing has two openings; in the intake region, the central opening 226 (126), and at the end of the volute, an outlet opening 228 (128) for the discharge of the flow from the volute housing.

Figure 5:
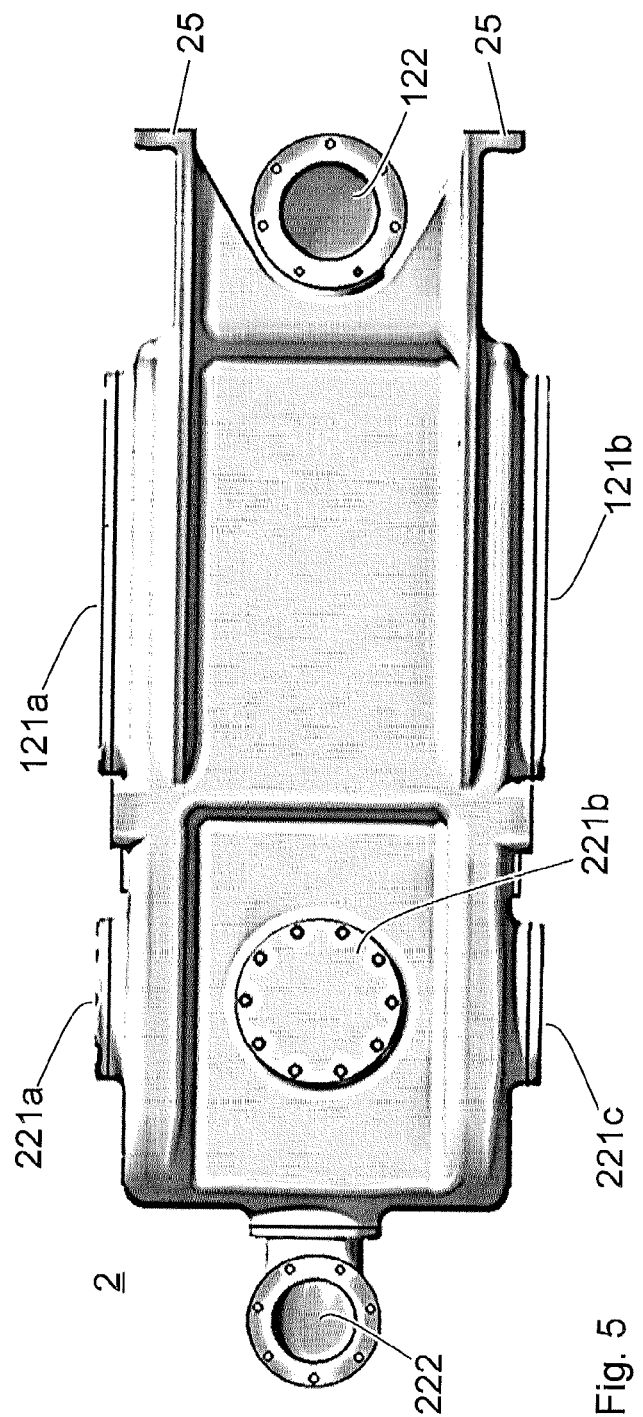
FIG. 5 shows a view from below of the two-stage exhaust-gas turbocharger arrangement of FIG. 3 according to an exemplary embodiment of the disclosure.
Figure 6:
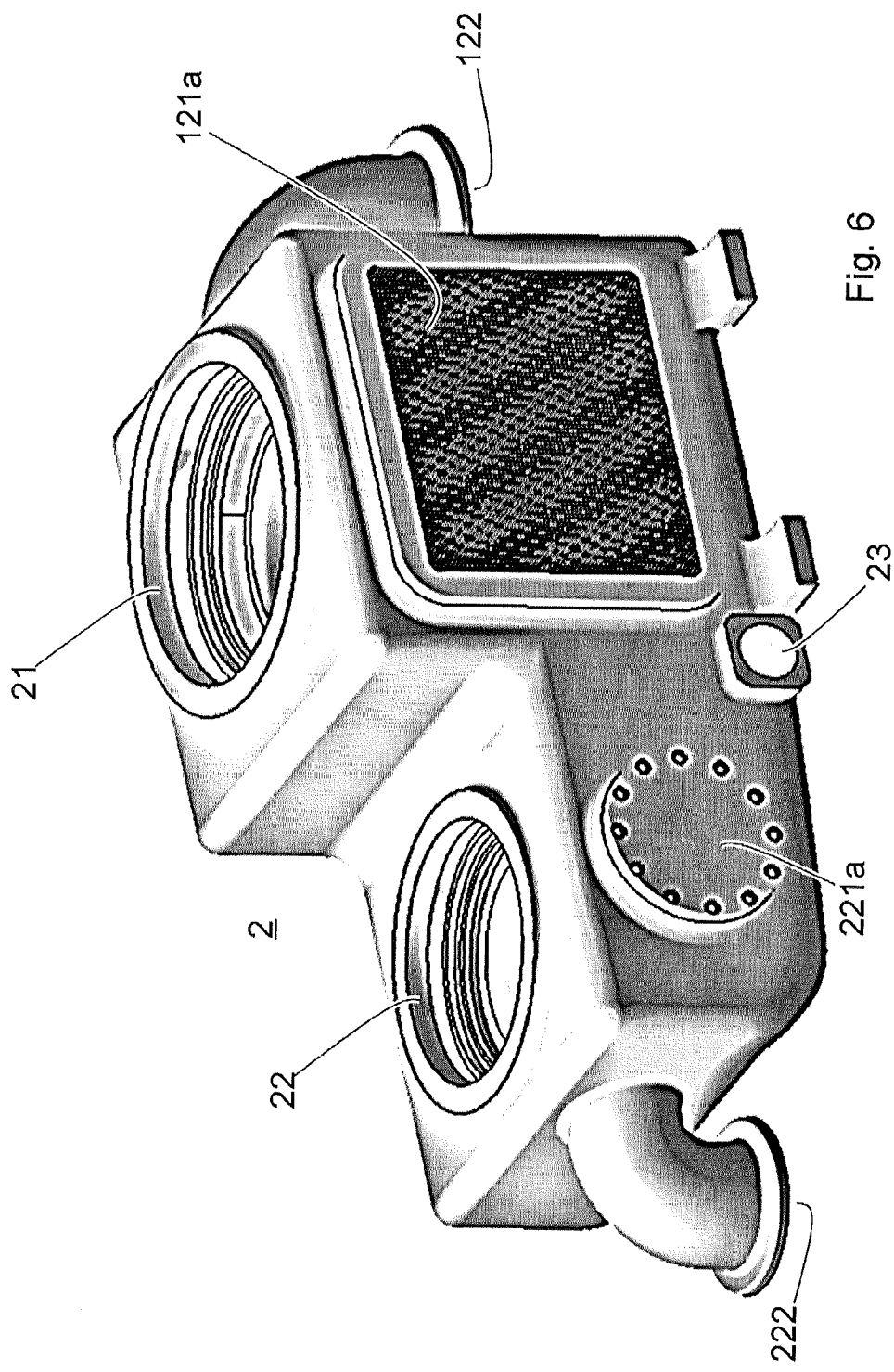
FIG. 6 shows an isometric view of the compressor housing of the two-stage exhaust-gas turbocharger arrangement of FIG. 3 according to an exemplary embodiment of the disclosure.
Figure 7:
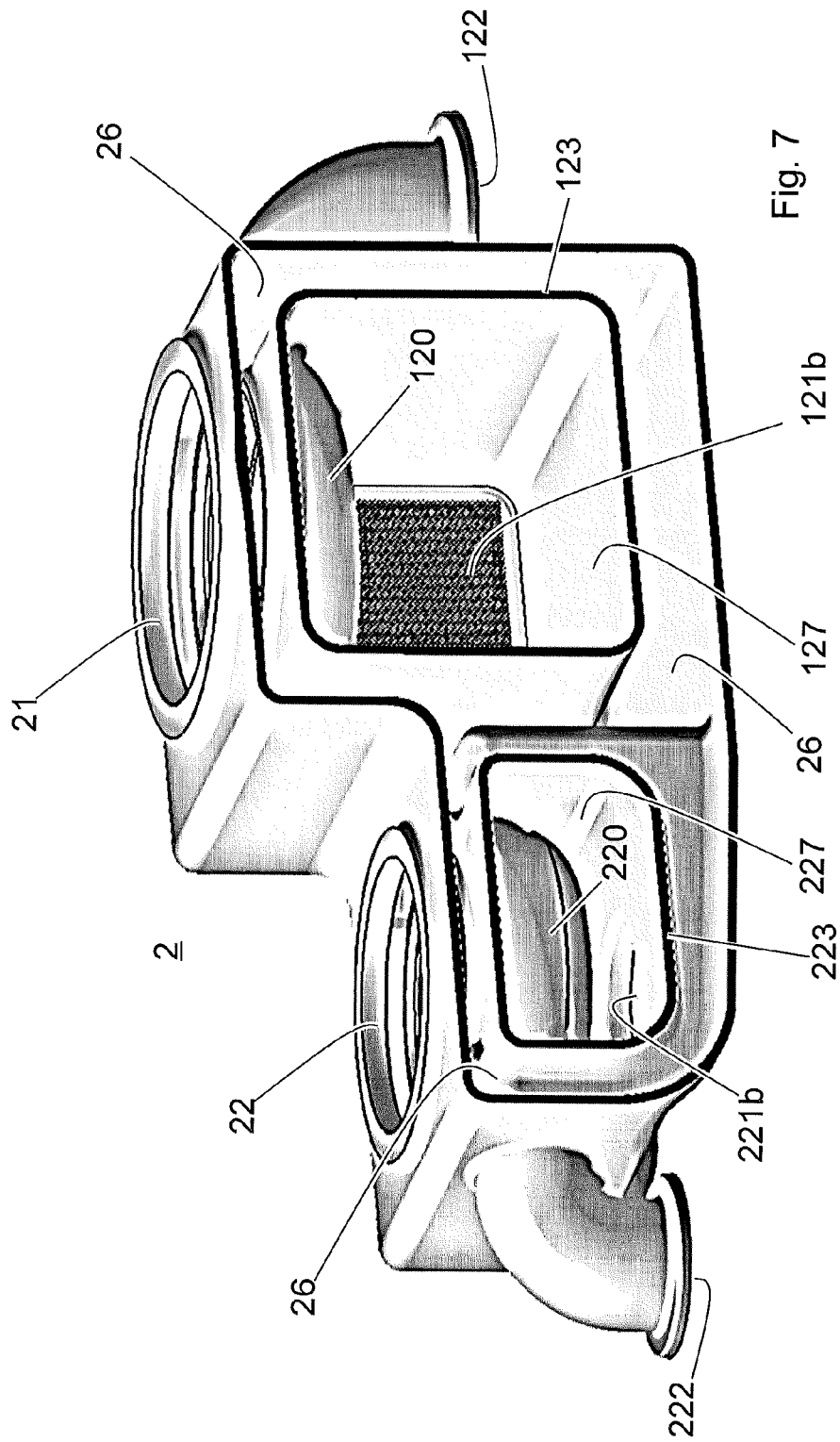
FIG. 7 shows a sectional view of the compressor housing of FIG. 6 according to an exemplary embodiment of the disclosure.

FIG. 5 shows a view from below of the two-stage exhaust-gas turbocharger arrangement of FIG. 3 according to an exemplary embodiment of the disclosure; FIG. 6 shows an isometric view of the compressor housing of the two-stage exhaust-gas turbocharger arrangement of FIG. 3 according to an exemplary embodiment of the disclosure; and FIG. 7 shows a sectional view of the compressor housing of FIG. 6 according to an exemplary embodiment of the disclosure.

The volute housing is arranged in the interior of a housing casing 223 (123), wherein the housing casing surrounds a cavity 227 (127), which serves as a collecting chamber for the air inlet. The end of the volute is led out of the housing casing and issues into the air outlet 222 (122). The air inlet of the volute housing, e.g., the central through opening 226 (126), issues into the cavity 227 (127). The supply of air into the cavity in the interior of the housing casing takes place via openings 221 (121) in a side surface of the housing casing. Here, an air intake pipe can be provided for connecting to the supply openings in the housing casing, or, as in the case of the low-pressure charger, a filter mat with additional sound deadening function can cover the supply opening. The housing casing has multiple side surfaces. The housing casing can be of cubic or cuboidal shape, or can be a polyhedron, with angle or rounded edges. If the housing casing has multiple side surfaces, it is also possible for multiple air inlet openings to be formed into the side surfaces. The additional surface permits a distribution of the inflow, which leads to less noise generation, which is of interest for example at the low-pressure air inlet. In the Figures, the multiple air inlet openings are denoted by 221*a*, 221*b* and 221*c*, and 121*a* and 121*b*, respectively. It is optionally possible for redundant air inlet openings to be closed off by means of a cover. The cover can also be advantageous for preventing contamination during transportation and during servicing.

The charge-air cooler units (not illustrated) known from the system diagram of FIG. 2 would be situated below the housing jacket 2.

Figure 8:
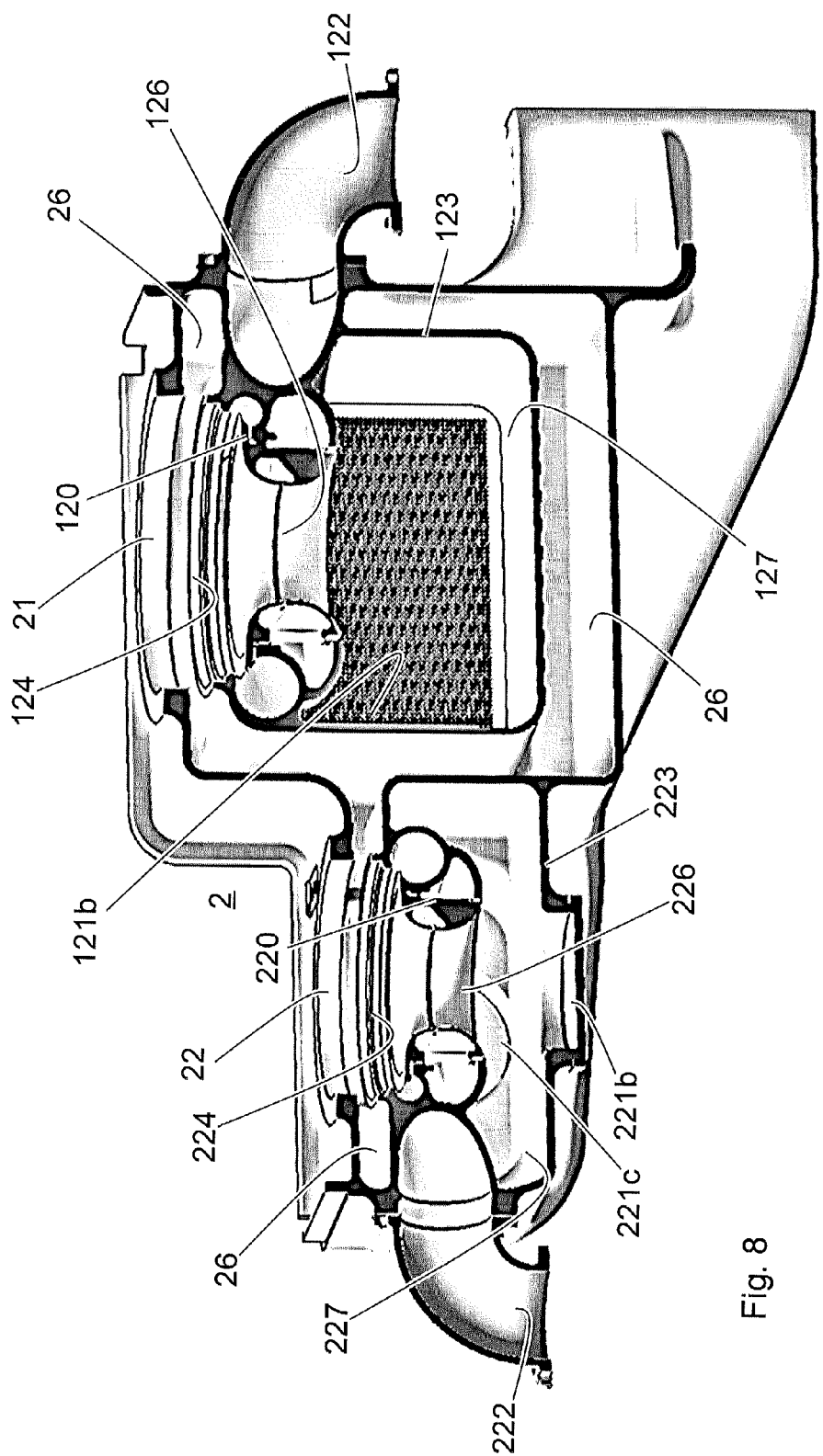
FIG. 8 shows a sectional view of the compressor housing of FIG. 6 according to an exemplary embodiment of the disclosure.
Figure 9:
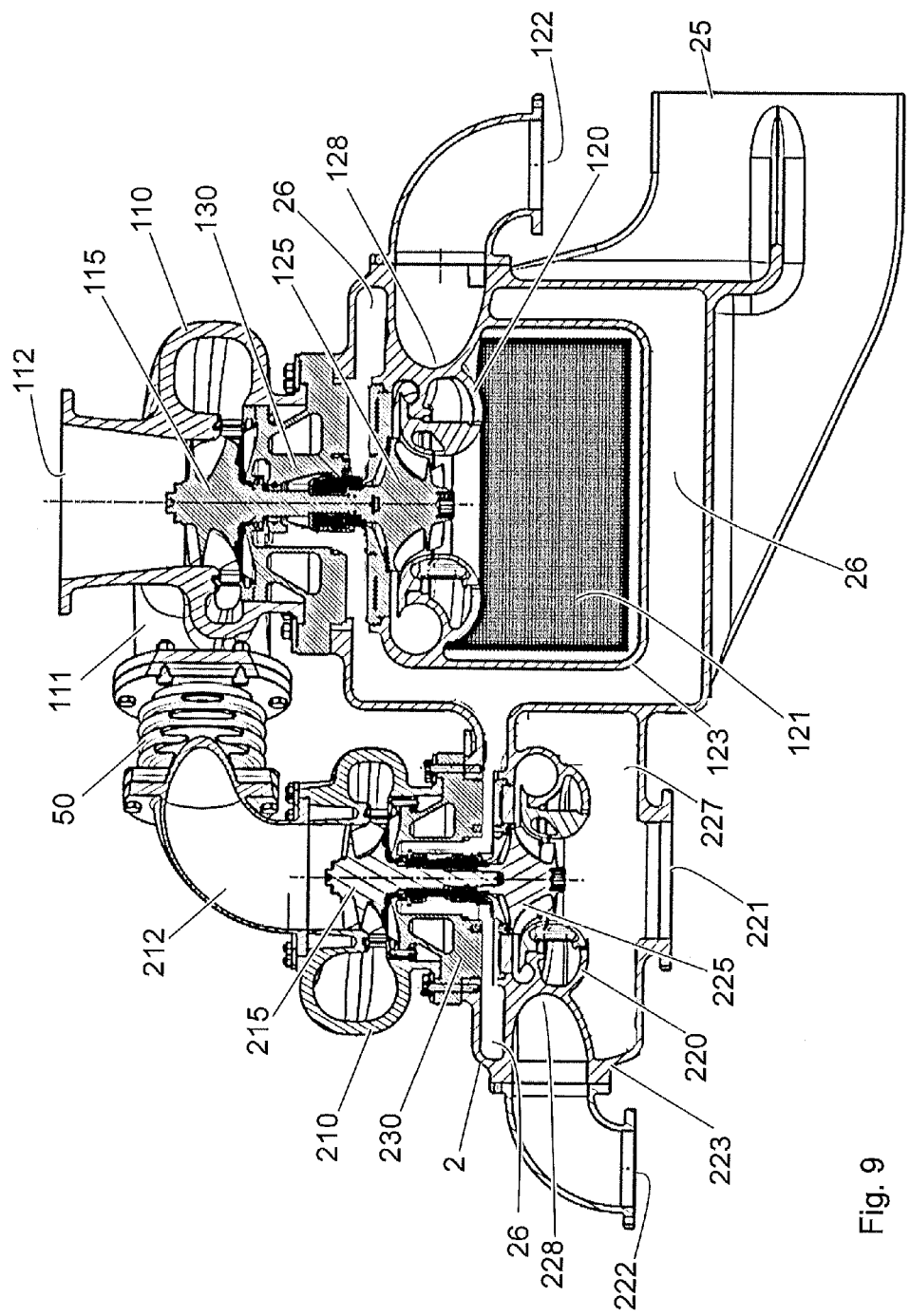
FIG. 9 shows a section, located along the vertically running shaft axes of the two exhaust-gas turbochargers, through the two-stage exhaust-gas turbocharger arrangement of FIG. 3 according to an exemplary embodiment of the disclosure.

FIG. 8 shows a sectional view of the compressor housing of FIG. 6 according to an exemplary embodiment of the disclosure; and FIG. 9 shows a section, located along the vertically running shaft axes of the two exhaust-gas turbochargers, through the two-stage exhaust-gas turbocharger arrangement of FIG. 3 according to an exemplary embodiment of the disclosure.

According to an exemplary embodiment of the disclosure, the housing casing 223 (123) can be arranged in an outer housing jacket. In the intermediate space between the housing casing and the housing jacket, there extends a cavity 26 which, at the lowest point, issues into an oil outlet 23. During the operation of the supercharging apparatus, a liquid is provided in the cavity, which liquid is intended for example for the cooling of the volute housing. As illustrated in the Figures, the volute housing is for this purpose connected to the upper housing wall of the housing casing, such that the volute housing and housing casing share the rear wall. If a liquid now flows over the rear wall, the volute housing is cooled.

The liquid advantageously originates from the bearing oil circuit. The liquid is used for cooling the bearing arrangement of the turbocharger shaft. No details with regard to the bearing arrangement are shown in FIG. 9. The vertically arranged rotor is however equipped with a correspondingly large axial bearing in order to accommodate the gravitational force acting in the axial direction in addition to the thrust load during operation. As indicated in FIG. 9, the cavity 26 extends into the bearing region in the rotor block. An advantage of this design is the cooling of the volute housing associated with the vertically directed oil outflow, whereby an additional cooling action on the air to be compressed in the compressor stage is obtained. Owing to this additional cooling action, the compressor efficiency of the supercharging system can be improved.

The oil outflow ducts can be sealed off by means of seals between the various housing parts.

The rotor block is made up of the compressor wheel 225 (125), the turbine wheel 215 (115), the shaft that connects the two wheels, and the bearing housing 230 (130). In the event of servicing, the rotor block can be lifted as a unit out of the compressor housing after the turbine housing 210 (110) has been removed. The turbine housing 210 (110) is connected to the bearing housing 230 (130) and to the housing jacket 2 by means of a lug-type connection in rotatable fashion such that different angular positions of the gas inlet (on the high-pressure charger) can be set. The turbine housing is arranged vertically above the housing jacket 2. The turbine housing is made up of the gas inlet 211

(111) and the gas outlet 212 (112). In the region of the turbine wheel, the turbine housing 210 (110) likewise surrounds a spiral-shaped flow duct and a guide apparatus for orientation of the flow toward the rotor blades of the turbine wheel, which is impinged on by flow radially. Since different degrees of expansion of the housing can arise owing to different gas temperatures between the turbines of the high-pressure charger and of the low-pressure charger, the connection between the gas outlet 212 of the turbine of the high-pressure charger and the gas inlet 111 of the turbine of the low-pressure charger is realized with a compensator element 50.

The housing jacket 2, the housing casings 223 and 123 and the volute housings 220 and 120 can be produced as a unipartite cast element. This reduces the number of components specified for a supercharging apparatus disclosed herein. Owing to the air inlet openings on multiple sides, it can possible to realize multiple attachment variants with one cast element. Connections that are not called for are simply covered by means of a cover. The air outlet line from the low-pressure compressor and the air outlet line from the high-pressure compressor are likewise integrated into, or at least fastened to, the housing unit.

On the housing jacket 2, there is arranged a fastening flange 25 which serves for the fastening of the unit as a whole to the engine bracket. The fastening flange can in this case has a horizontal abutment surface for mounting onto the engine bracket from above (FIG. 6), or, as in the other Figures, can have a vertical abutment surface for lateral attachment to the engine bracket.

The high-pressure turbocharger and the low-pressure turbocharger can conceptually be of an identical construction, or can at most differ, for thermodynamic reasons, in terms of structural size and in terms of the rotating components, such as for example the compressor wheel or the turbine.

The compressor housing concept according to the disclosure has been explained in detail based on the two-stage supercharging unit illustrated in the figures. The compressor housing concept according to the disclosure can however be applied equally to single-stage supercharging units or three-stage and multi-stage supercharging units.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

2 Housing jacket
21 Opening in the housing jacket for rotor block of the low-pressure exhaust-gas turbocharger
22 Opening in the housing jacket for rotor block of the high-pressure exhaust-gas turbocharger
23 Oil outlet
24 Oil inlet
25 Fastening flange
26 Cavity between housing jacket and housing casing
41, 42 Insulation element, part of the insulation shell arrangement
45 Connecting elements for connecting the insulation elements
50 Compensator element between the turbines
110 Turbine housing of the turbine of the low-pressure exhaust-gas turbocharger
111 Gas inlet of the turbine of the low-pressure exhaust-gas turbocharger
112 Gas outlet of the turbine of the low-pressure exhaust-gas turbocharger
115 Turbine wheel of the low-pressure exhaust-gas turbocharger
120 Volute housing of the compressor of the low-pressure exhaust-gas turbocharger
121 Air inlet of the compressor of the low-pressure exhaust-gas turbocharger (a, b)
122 Air outlet of the compressor of the low-pressure exhaust-gas turbocharger
123 Housing casing of the compressor housing of the low-pressure exhaust-gas turbocharger
124 Opening in the housing casing for the insertion of the compressor wheel
125 Compressor wheel of the low-pressure exhaust-gas turbocharger
126 Central through opening in the volute housing
127 Cavity in the housing casing (collecting chamber for air inlet)
128 Opening in the volute housing for the discharge of the flow from the volute housing
130 Bearing housing of the low-pressure exhaust-gas turbocharger
210 Turbine housing of the turbine of the high-pressure exhaust-gas turbocharger
211 Gas inlet of the turbine of the high-pressure exhaust-gas turbocharger
212 Gas outlet of the turbine of the high-pressure exhaust-gas turbocharger
215 Turbine wheel of the high-pressure exhaust-gas turbocharger
220 Volute housing of the compressor of the high-pressure exhaust-gas turbocharger
221 Air inlet of the compressor of the high-pressure exhaust-gas turbocharger (a, b, c)
222 Air outlet of the compressor of the high-pressure exhaust-gas turbocharger
223 Housing casing of the compressor housing of the high-pressure exhaust-gas turbocharger
224 Opening in the housing casing for the insertion of the compressor wheel
225 Compressor wheel of the high-pressure exhaust-gas turbocharger
226 Central through opening in the volute housing
227 Cavity in the housing casing (collecting chamber for air inlet)
228 Opening in the volute housing for the discharge of the flow from the volute housing
230 Bearing housing of the high-pressure exhaust-gas turbocharger

What is claimed is:
1. A housing apparatus, comprising:
a housing casing which surrounds a first cavity and which has multiple side surfaces;
a volute housing arranged in an interior of the housing casing, said volute housing having a central through opening for accommodating a compressor wheel of a rotor and for supplying air from the first cavity to the compressor wheel arranged in said opening, and having a further opening for discharging flow from the volute housing; and a housing jacket and a second cavity extending between the housing jacket and the housing casing, the second cavity being at least partially filled with liquid;

wherein a side surface of the housing casing includes a first opening for a lead through of the compressor wheel to be arranged in the volute housing, wherein a side surface of the housing casing includes a second opening for discharging, from the housing casing, the flow out of the volute housing, wherein at least one side surface of the housing casing includes a third opening for supplying air into the first cavity in the interior of the housing casing, and wherein the liquid is conducted out of a bearing region of the rotor into the second cavity between the housing jacket and the housing casing, wherein the liquid runs down over the housing casing under force of gravity.

2. The housing apparatus as claimed in claim 1, wherein the first opening in the volute housing extends in a vertical direction, so that the volute housing is configured for accommodating the compressor wheel rotating about a vertical axis.

3. The housing apparatus as claimed in claim 1, wherein the volute housing and the housing casing share a common side wall, wherein an opening is formed into said common side wall, and the first opening of the volute housing issues into said opening in the common side wall.

4. The housing apparatus as claimed in claim 1, wherein, multiple third openings for the supply of air into the first cavity in the interior of the housing casing are formed into the housing casing, into different side surfaces in each case.

5. The housing apparatus as claimed in claim 4, wherein at least one of the multiple third openings is closed off by means of a cover.

6. The housing apparatus as claimed in claim 1, wherein the housing casing is surrounded by the housing jacket, and the openings in the housing casing are led out of the housing jacket through corresponding openings in the housing jacket.

7. An exhaust-gas turbocharger, wherein the rotor is vertically arranged and having a turbine wheel and the compressor wheel, wherein the compressor wheel is arranged in the housing apparatus as claimed in claim 6.

8. The exhaust-gas turbocharger as claimed in claim 7, wherein a turbine wheel housing is arranged vertically above the housing jacket, wherein a multi-part insulation shell arrangement which is fitted on the housing jacket completely surrounds the turbine wheel housing and leaves free an opening for supplying hot exhaust gases and an opening for discharging hot exhaust gases.

9. The exhaust-gas turbocharger as claimed in claim 8, wherein the housing jacket includes a fastening flange for fastening the exhaust-gas turbocharger to an internal combustion engine.

10. The exhaust-gas turbocharger as claimed in claim 7, wherein the housing jacket includes a fastening flange for fastening the exhaust-gas turbocharger to an internal combustion engine.

11. The housing apparatus as claimed in claim 1, comprising multiple of the housing casings jointly surrounded by the housing jacket, wherein the second cavity extends between the housing jacket and the housing casings, and wherein the openings in the housing casings are led out of the housing jacket through corresponding openings in the housing jacket.

12. A supercharging assembly comprising:
multiple exhaust-gas turbochargers each with a vertically arranged rotor with in each case one turbine wheel and one compressor wheel, wherein the multiple compressor wheels are arranged in a housing apparatus as claimed in claim 11.

13. The supercharging assembly as claimed in claim 12, wherein the multiple exhaust-gas turbochargers are connected to form a multistage supercharging system, wherein the compressor wheel and turbine wheel of two successive stages are connected in each case in series, such that the turbine wheel of a higher stage is positioned upstream of the turbine wheel of a lower stage and the compressor wheel of the higher stage is positioned downstream of the compressor wheel of the lower stage.

14. The supercharging assembly as claimed in claim 13, wherein the housing jacket includes a fastening flange for the fastening of the exhaust-gas turbocharger or of the supercharging assembly, respectively, to an internal combustion engine.

15. The supercharging assembly as claimed in claim 12, wherein turbine wheel housings of the turbine wheels are arranged vertically above the housing jacket, wherein a multi-part insulation shell arrangement that is fitted on the housing jacket completely surrounds the turbine wheel housings and leaves free an opening for supplying hot exhaust gases and an opening for discharging hot exhaust gases.

16. The supercharging assembly as claimed in claim 12, wherein the housing jacket includes a fastening flange for the fastening of the exhaust-gas turbocharger or of the supercharging assembly, respectively, to an internal combustion engine.

17. An exhaust-gas turbocharger, comprising:
a housing casing which surrounds a first cavity and which has multiple side surfaces;

a volute housing arranged in an interior of the housing casing, said volute housing having a central through opening for accommodating a compressor wheel of a rotor and for supplying air from the first cavity to the compressor wheel arranged in said opening, and having a further opening for discharging flow from the volute housing; and a housing jacket and a second cavity extending between the housing jacket and the housing casing;

wherein a side surface of the housing casing includes a first opening for a lead through of the compressor wheel to be arranged in the volute housing, wherein a side surface of the housing casing includes a second opening for discharging, from the housing casing, the flow out of the volute housing, wherein at least one side surface of the housing casing includes a third opening for supplying air into the first cavity in the interior of the housing casing, wherein the rotor is vertically arranged and has a turbine wheel, wherein a turbine wheel housing is arranged vertically above the housing jacket, and wherein a multi-part insulation shell arrangement which is fitted on the housing jacket completely surrounds the turbine wheel housing and leaves free an opening for supplying hot exhaust gases and an opening for discharging hot exhaust gases.

18. The exhaust-gas turbocharger as claimed in claim 17, wherein liquid is conducted out of a bearing region of the rotor into the second cavity, wherein the liquid runs down over the housing casing under force of gravity.

19. A supercharging assembly, comprising:

multiple housing casings which each surrounds a first cavity and which have multiple side surfaces;

a volute housing arranged in an interior of each of the housing casings, said volute housing having a central through opening for accommodating a compressor wheel of a rotor and for supplying air from the first cavity to the compressor wheel arranged in said opening, and having a further opening for discharging flow from the volute housing;

a housing jacket jointly surrounding the housing casings, wherein a second cavity which is at least partially filled with liquid extends between the housing jacket and the housing casings, and wherein the openings in the housing casings are led out of the housing jacket through corresponding openings in the housing jacket;

wherein a side surface of each of the housing casings includes a first opening for a lead through of the compressor wheel to be arranged in the volute housing, wherein a side surface of each of the housing casings includes a second opening for discharging, from the housing casing, the flow out of the volute housing, and wherein at least one side surface of each of the housing casings includes a third opening for supplying air into the first cavity in the interior of the housing casing; and multiple exhaust-gas turbochargers each with a vertically arranged rotor with in each case one turbine wheel and one compressor wheel;

wherein turbine wheel housings of the turbine wheels are arranged vertically above the housing jacket, wherein a multi-part insulation shell arrangement that is fitted on the housing jacket completely surrounds the turbine wheel housings and leaves free an opening for supplying hot exhaust gases and an opening for discharging hot exhaust gases.

20. The supercharging assembly as claimed in claim 19, wherein the liquid is conducted out of a bearing region of each rotor into the second cavity, wherein the liquid runs down over the housing casings under force of gravity.

* * * * *